Figures 1, 2:
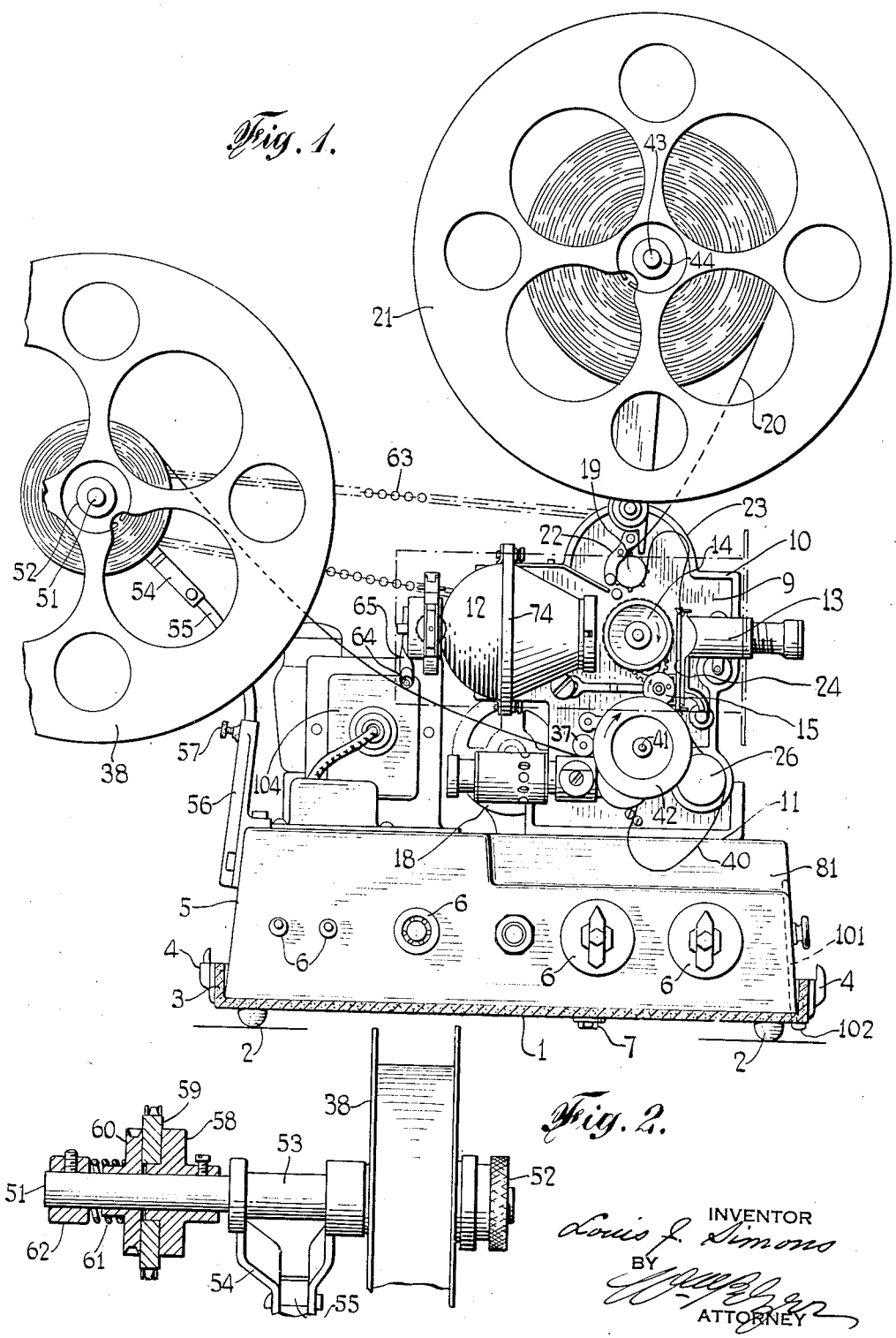

June 20, 1939.　　　L. J. SIMONS　　　2,163,263
COMBINED MOTION PICTURE PROJECTOR AND SOUND REPRODUCER
Filed Feb. 6, 1936　　　4 Sheets-Sheet 1

INVENTOR
Louis J. Simons
BY
ATTORNEY

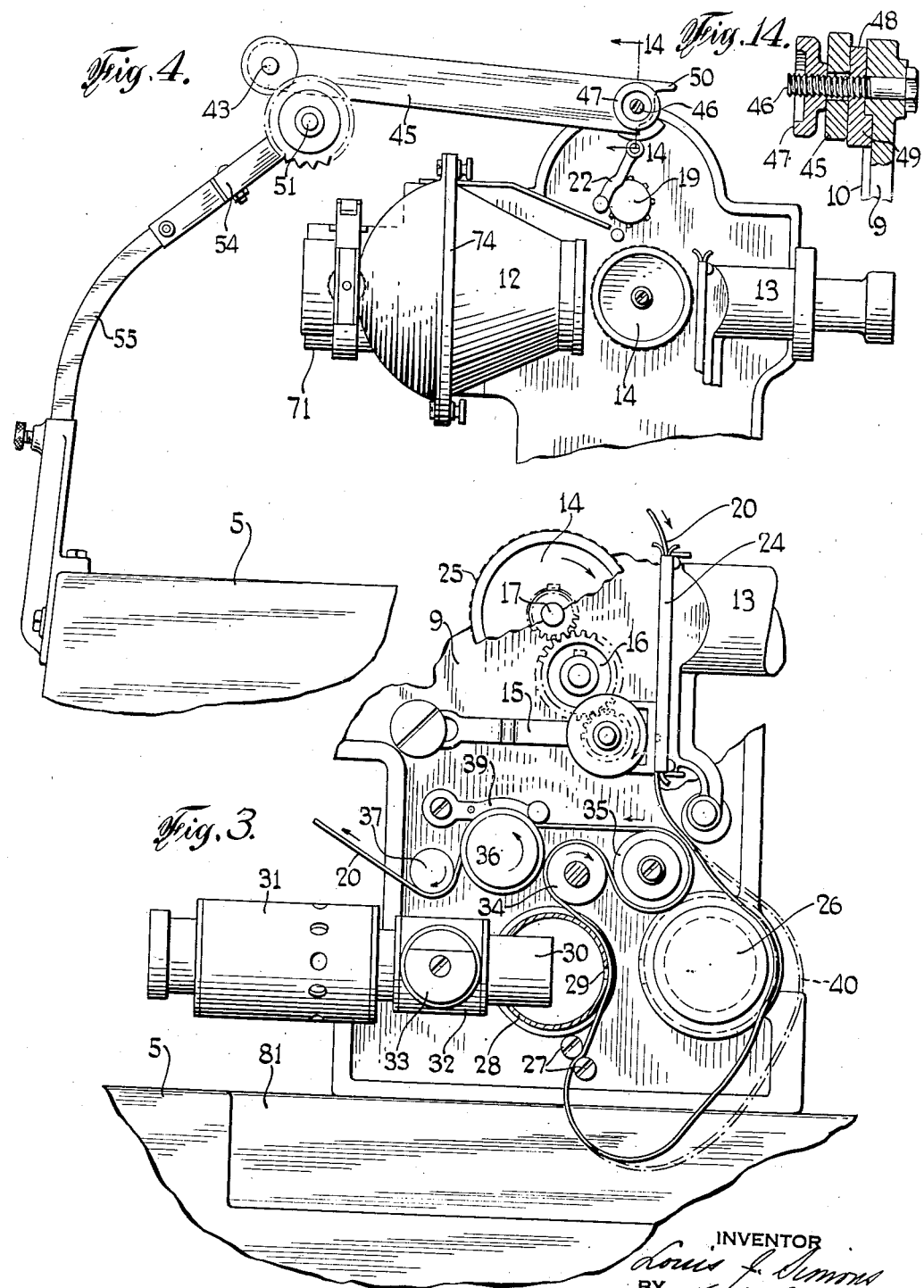

June 20, 1939.  L. J. SIMONS  2,163,263
COMBINED MOTION PICTURE PROJECTOR AND SOUND REPRODUCER
Filed Feb. 6, 1936   4 Sheets-Sheet 3
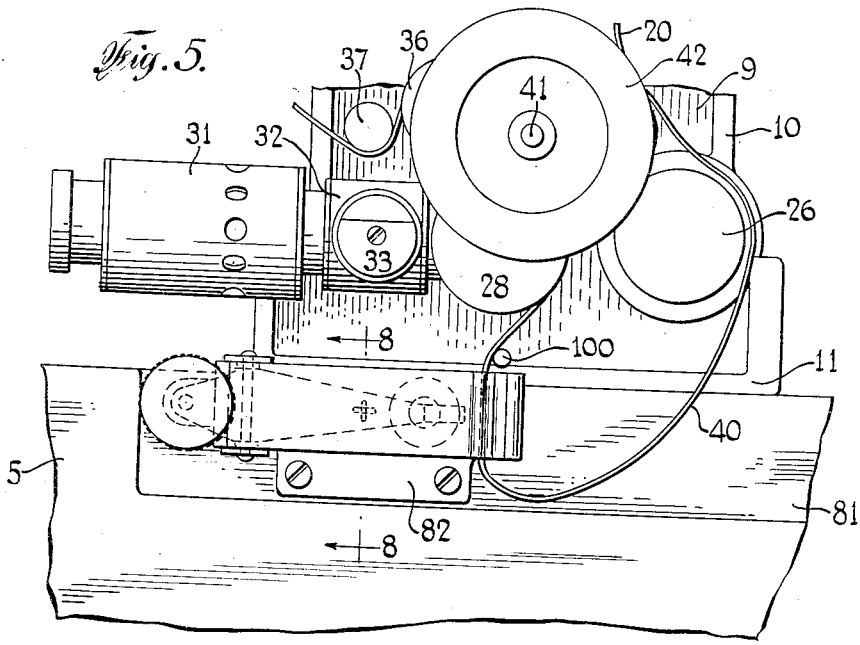
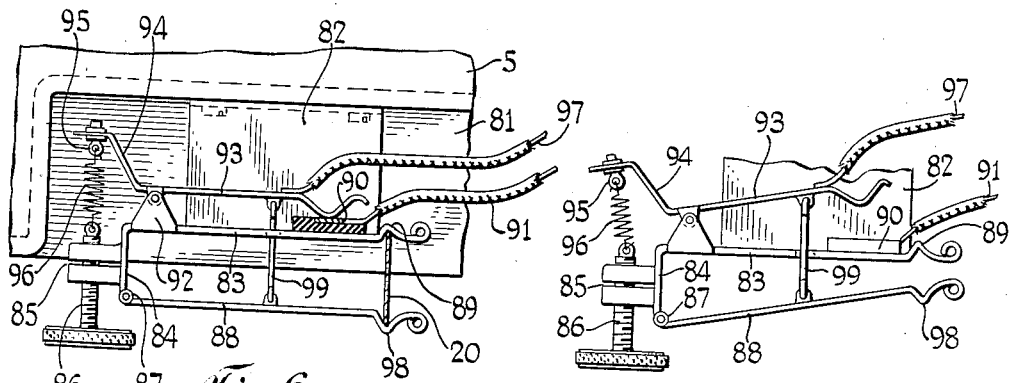
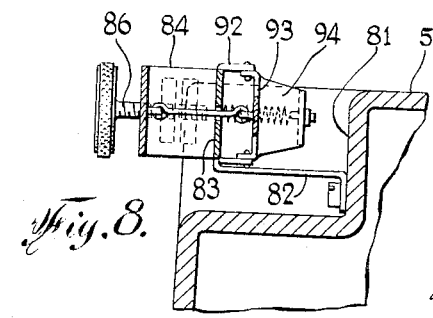
INVENTOR
Louis J. Simons
BY
ATTORNEY June 20, 1939.  L. J. SIMONS  2,163,263
COMBINED MOTION PICTURE PROJECTOR AND SOUND REPRODUCER
Filed Feb. 6, 1936  4 Sheets-Sheet 4
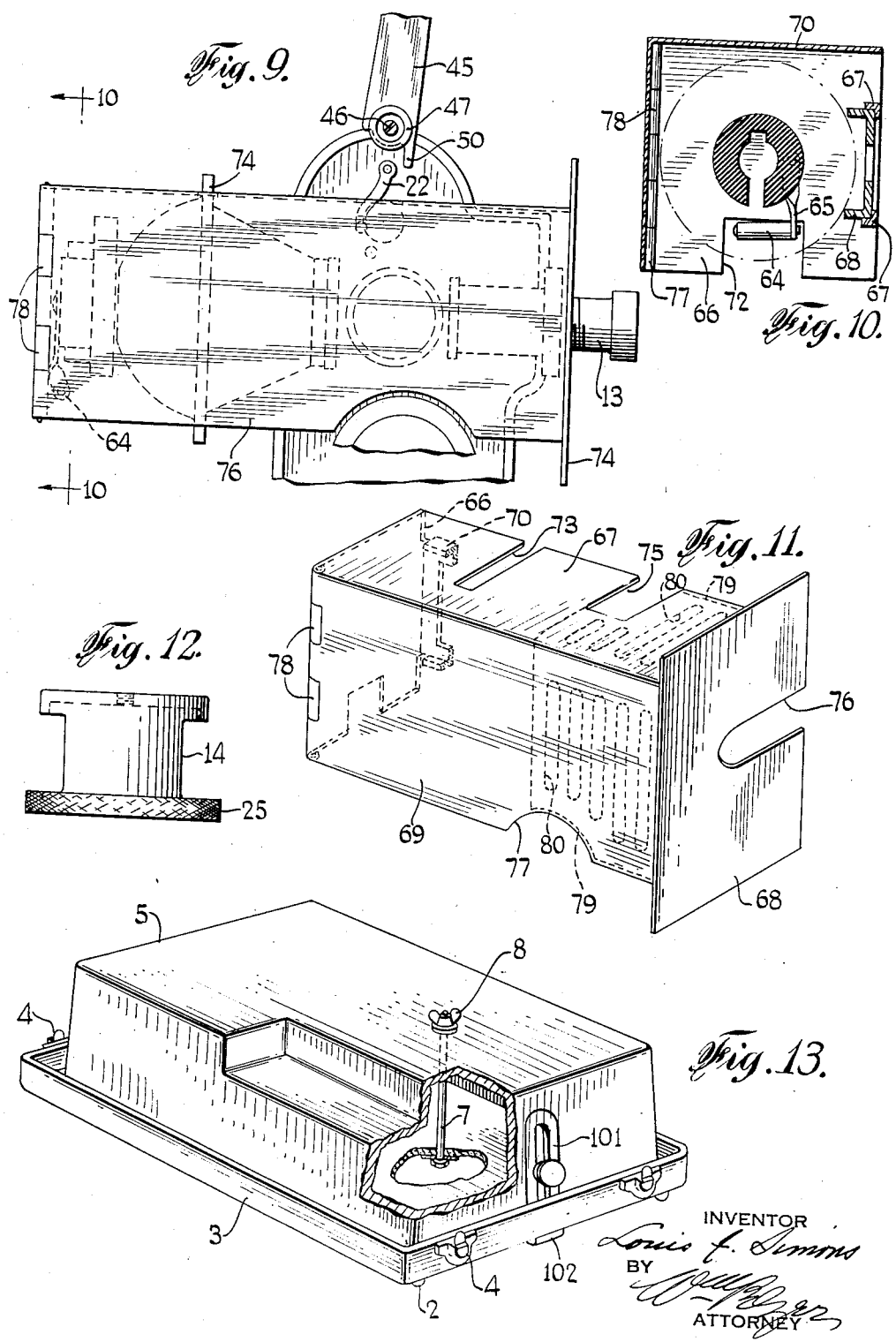

Patented June 20, 1939

2,163,263

UNITED STATES PATENT OFFICE 2,163,263

COMBINED MOTION PICTURE PROJECTOR AND SOUND REPRODUCER

Louis J. Simons, New York, N. Y., assignor to Sound Products Co. Inc., a corporation of New York Application February 6, 1936, Serial No. 62,553

4 Claims. (Cl. 88—16.2)

My invention relates to motion picture projectors employing picture films provided with photographic sound records, and the main object is to provide a combined projector and sound record reproducer designed especially for 16 mm. film, and in carrying my invention into effect I have devised features of construction designed to provide a film feed of uniform tension across the sound record translator without the use of delicately balanced tension mechanism whereby the film feed mechanism is greatly simplified and made especially adaptable for small projectors of the so-called home type. Other features of construction involve the film framing; adjustable take-up reel for adjusting the tension of the take-up; film rewinding by the film driving mechanism without reversing the direction of the driving mechanism; and other minor features of construction all resulting in a compact structure embodying a complete motion picture projector, sound record translator, electrical amplifier and loud speaker.

My invention is illustrated in the accompanying drawings in which, Figure 1 is a side elevation of the projector set up for projection; Figure 2, an enlarged view of the film take-up with the driving clutch shown in section; Figure 3, an enlarged side elevation showing the film feed; Figure 4, an enlarged view showing the film reel supports shifted into inoperative position ready for enclosing the projector in its carrying case; Figure 5, a side elevation illustrating a circuit controller governed by the motion picture film; Figures 6 and 7, plan views of the circuit controller in the closed and open positions, respectively; Figure 8 a cross section on the line 8—8 of Figure 5; Figure 9, a side elevation of part of the projector showing a removable housing for the light projector, rotary shutter, film gate and lens tube; Figure 10, a cross section on the line 10—10 of Figure 9; Figure 11, a perspective view of the housing shown in Figure 9; Figure 12, a plan view of the rotary shutter; Figure 13, a perspective view of the base of the projector partly broken away to show the single bolt for securing the base members together; and Figure 14 a vertical section on the line 14—14 of Figure 4.

Referring to the drawings, 1 indicates the base plate of the apparatus and which is also the base or bottom of the carrying case for the apparatus, and is shown provided with four rubber or other cushioned buttons 2, and a flange 3 to which are secured members 4 of a set of snap fasteners, the co-operating members of which are secured to a cover (not shown) which encloses the entire apparatus when in position, and in which cover the loud speaker for use with the sound record translator and amplifier will be mounted. Secured to base plate 1 is a hollow platform 5 within which the chassis carrying the electrical control and amplifying devices will be mounted. These devices will be of the conventional type and are not illustrated since they form no part of my present invention, but the usual controlling switches, dials, etc., are indicated collectively by the reference numeral 6 as mounted on one side of the platform serving as a control panel board as shown in Figure 1. This platform is seated on all four sides closely within flanges 3 as seen in Figure 1 to hold it against lateral displacement on the base plate, and the platform is secured thereto by a single bolt 7 having a wing nut 8 at the top as shown in Figure 13. This single bolt permits easy access to the amplifying devices when necessary.

Bolted to the platform in upright position is a single frame plate 9 having stiffening flanges 10 and seating flange 11. Mounted on one side of this plate is the light projector 12 containing an electric lamp, and in alignment with the light projector is the projector lens tube 13. Between the light projector and the lens tube is a rotary shutter 14 mounted on a shaft having a bearing in frame plate 9 and between this shutter and the conventional claw-feed mechanism 15 for the film is a train of gearing 16, all mounted in bearings on plate 9. The film feed and its train of gearing are shown without specific detail in Figures 1 and 3 since any suitable arrangement may be employed. The rotary tubular shutter is on the main driven shaft 17 which on the opposite side of frame plate 9 has a driving pulley (not shown) driven by a belt from motor 18 mounted on platform 5, Figure 1. It will be understood that the driving connection between the motor and rotary shutter will be such as to rotate the shutter the proper number of revolutions per minute to properly expose each picture frame on the film. Mounted above the rotary shutter is the usual feed and upper film loop forming sprocket wheel 19 which is geared to the main driven shaft on the opposite side of plate 9 and rotates continuously, the intermittent feed from the film loop being obtained by the intermittent claw-feed mechanism 15.

The picture and sound record film is indicated at 20 and unwinds from feed reel 21. This film is looped around the continuously rotating feed sprocket wheel 19 and held in engagement therewith by a pivoted retaining latch 22. The feed sprocket forms the film loop 23, Figure 1, and this section of the film is drawn through the usual film gate 24 by the claw-feed mechanism.

It is usual in motion picture projectors to frame the pictures so as to register correctly with the aperture in the film gate adjacent the lens tube by opening the gate and setting a picture frame squarely in register with the aperture and then closing the gate. This action does not always correctly registed the picture because the feed mechanism, or rather the feed claw, may be in such position as to cause a slight forward or backward movement of the film when the claw registers with the film sprocket holes. This requires reopening of the gate and readjustment of the film until the correct relative position of the sprocket holes and feed claw is obtained. I accomplish this adjustment by directly actuating the claw-feed mechanism through the train of gears between the shutter and feed mechanism by rotating the shutter by hand without the necessity for first registering the picture frame with the exposure aperture. That is, I first insert the film within the film gate, leaving a sufficiently long loop 23, and close the gate without attempting to register a picture frame with the exposure aperture; then I rotate the shutter by hand by means of the knurled knob or rim 25 which through the train of gears actuates the feed mechanism 15 and thereby moving the film downward past the aperture in the gate 24 until the picture frame shows properly on the screen. This action not only moves the film forward but also actuates sprocket 19 to draw film from the reel 21 and thereby maintains the loop 23 at the desired length without separate readjustment thereof as might be necessary when the film adjustment is made by adjusting the feed section in advance of the loop relative to the gate aperture.

From the film gate the film is looped around the housing 26 for the usual photo-electric cell in a long loop and fed between a pair of guide pins 27 and over the aperture block 28. This block which I make in tubular form is secured to plate 9 and is provided with light beam aperture 29 and a large aperture diametrically opposite into which is closely fitted the lens tube 30 containing the usual arrangement of cylindrical lens and optical slit for projecting the beam of light through aperture 29 onto the photographic sound track on the film. The usual exciter lamp is housed in tubular casing 31. Tubes 30 and 31 are supported by bearing sleeve 32 secured to plate 9 and the tubes are held in adjusted position by a clamp and screw 33.

The guide pins 27 are set at an angle as shown in Figure 3 so that as the film is drawn between them a short bend is imparted thereto to produce a slight tension on the film where it passes over the aperture block. From the aperture block 28 the film passes over a smooth faced roller 34 and from that roller under and over a second smooth faced roller and back over the feed take-up sprocket 36 and under a guide roller 37 from whence it leads to the take-up reel 38, a roller 64 carried by arms 65 attached to the rear of the lamp house 12 being provided to guide the film to the reel and hold it out of contact with the lamp house. The film is held in engagement with the take-up sprocket 36 by a hinged clamp 39.

It will be noted that the film after passing over the aperture block 28 is reversed as it passes in an S-loop over rollers 34 and 35. These closely reversed loops place a slight tension on the film and holds it with sufficient firmness against the aperture block. Furthermore, the tension produced at the pins 27 prevents all vibrations and slack caused by the movements of the lower loop 40 to pass beyond the pins, and any slack in take-up at the take-up sprocket due to irregularity in rotation of the take-up sprocket, or slack between the sprocket teeth and film perforations will not affect the tension of the film section passing over the aperture block because the tension produced by the frictional engagement of the film at the S-loop will be sufficient to maintain the proper tension of the film section between that point and the pins 27. From this it will be seen that I am enabled by the use of an ordinary pair of pins and rollers to accomplish all the functions of the customary balanced compensating fly wheel employed in sound translating mechanisms of picture projectors. In order to obtain a steady rotation of the roller 34 it is mounted on or formed integral with a spindle 41 having a bearing in plate 9 and on this spindle is mounted a relatively large cupped disk 42, Figures 1 and 5, which serves as a fly wheel.

The film feed reel 21 is journalled on a stud 43 and held by a nut 44, Figure 1, at the end of an arm 45 which is hinged on a bolt 46 seated in a hole at the arched top of plate 9. Arm 45 is locked in elevated position by a nut 47 which clamps the arm against a washer 48 which has an arched shoulder 49 extending under flange 10 of plate 9 to hold it against turning on the bolt as shown in Figures 4 and 14. Arm 45 is provided with a finger 50 which bears against the hinge of latch 22, or other stop pin, to hold the arm in vertical position while screwing nut 47 into clamping position. The film take-up reel 38 is sleeved on a spindle 51 and locked thereon by nut 52. Spindle 51 is journalled in a sleeve 53, Figure 2, having a yoke 54 bolted to an arm 55 which is bent as shown in Figures 1 and 4 and telescoped into socket 56 which is bolted to platform 5. A set-screw 57 is threaded in socket 56 to clamp the arm in position in the socket. On the opposite end of spindle 51 is mounted the driving clutch for reel 38. This clutch comprises a disk 58 secured to the spindle by a set-screw, a sprocket disk 59 journalled on the hub of disk 58, a pressure disk 60 and coiled spring 61 for holding sprocket 59 in frictional engagement with disk 58, and an adjustable collar 62 secured to spindle 51 by a set-screw for adjusting the pressure of spring 61. Sprocket disk 59 is driven by chain 63, Figure 1, which is driven by a sprocket wheel (not shown) on the spindle of film sprocket 19 on the opposite side of frame plate 9. The purpose of the clutch on the take-up spindle 51 is to permit slip as the diameter of the film on the take-up reel increases. To adjust the tension of sprocket chain 63 for the proper driving connection, arm 55 is adjusted vertically in socket 56. It will be understood that by this vertical adjustment the distance between the centers of the spindles of sprockets 59 and 19 may be varied. When the projector is to be enclosed in its carrying case, reels 21 and 38 are removed, nut 47 is loosened and arm 45 dropped to the horizontal position of Figure 4, and set-screw 57 is loosened and arm 55 withdrawn from its socket and re-inserted in reversed position as shown in Figure 4.

For enclosing the picture projecting mechanism during operation and to reduce the sound caused by the film feed by the sprockets, claw-feed, and the snapping sound of the film, I provide the cover shown in Figures 9, 10 and 11. This cover has an end wall 66, top 67, front end 68 and front side 69, the inner side and bottom being entirely open. The end wall 66 has secured thereto a flanged slide 70 which has a tight sliding fit on the extension 71 of the frame plate 9. Wall 66 has a rectangular cut-out 72 to permit passage of the film 20 to the take-up reel 38, the film contacting with roller 64 to hold it out of contact with the lamp house 12 and the edge of wall 66. The top plate 67 has a slit 73 to clear the circumferential flange 74 of the lamp house 12, and a wider slit 75 for the passage of the film 20 from the feed reel 21 and to provide sufficient clearance for the film loop 23. The front end plate 68 has a slit 76 to clear the lens tube 13, and the front side plate 69 has an arched cut-out 77 to clear the fly-wheel 42. The sides 67, 68 and 69 are rigidly secured together and are hinged to the end plate 66 by hinge 78 to swing outward to afford access to the projector parts and for threading the film. On the inner sides of cover plates 67 and 69 at the end which covers the shutter, film gate, lens tube and claw-feed, I provide a coating of sound deadening material 79, Figure 11, such as cork, preferably in thin sheet form and provided with slits 80 to break up sound waves. Instead of a sheet of cork with slits, narrow strips of cork may be employed suitably spaced apart to provide slits or spaces 80. I have not shown a sound deadening material on the inside of cover plate 68 as I consider the parts shown covered to be sufficient.

In Figures 5, 6, 7 and 8 is illustrated a circuit controller for opening the electrical circuit to the projector, automatically, when the picture film breaks, or when the lower loop 40 through any cause becomes too short, or when the edges of the film become damaged or torn. This device is located in the recess 81 formed on the side of platform 5 where the other control devices 6 are located. The device is supported by a bracket 82 bolted to the base platform, and which bracket has an upright extension 83 which extends beyond the bracket section, and bent at one end at right angles as shown at 84 and to which a split stud 85 is secured, and which stud is tapped to receive thumb-screw 86. The end of angle 84 is formed into hinge knuckles 87 to which a plate 88 is hinged. The opposite or free end of the extension 83 is bent or notched cross-wise to form a V-groove 89, and adjacent this notch is secured a block of insulating material having a contact plate 90 to which circuit wire 91 is attached. Near the right angle bend 84 two ears 92 project from section 83 to form a pivot for contact blade 93 which has a bent arm 94 provided with an eyebolt 95, and between this bolt and screw 86 a coiled spring 96 is connected. The pull of spring 96 is adjusted by screw 86, the split stud serving to hold the screw in its adjusted position. The free or contact end of blade 93 is bent to provide a contact point which makes contact with plate 90, and a circuit wire 97 is attached to blade 93. Plate 88 is bent or notched cross-wise to form a V-groove 98 similar to and in alignment with notch 89 on section 83. Contact blade 93 and hinged plate 88 are provided with perforated lugs between which a link 99 is hooked connecting them in parallel position as shown in Figure 6, and spring 96 tends to pull the contact blade 93 away from contact plate 90 and plate 88 moves with it as shown in Figure 7. The V-notches 89 and 98 are designed to receive and lightly grip the edges of picture film 20 as seen in Figure 6, and when the film is in position it has sufficient stiffness to hold contact blade 93 in contact with plate 90 against the pull of spring 96. If for any reason the film buckles, or its edges become damaged or torn, or if the film is torn cross-wise so that it parts, or if the loop 40 becomes so short that it causes the film to pull out of the V-notches, the pull of spring 96 will tilt contact blade 93 and plate 88 toward the position of Figure 7 and automatically open the circuit to the motor and other electrical devices. With this circuit controlling device I employ a single guide pin or roller 100, instead of the pair of pins 27, to guide the film to and hold it against the slit block 28, and also to prevent the film pulling out of the V-notches during the normal operation. The slight pressure on the edges of the film by the blades 83 and 88 also serves to provide the necessary tension on the film section passing over the slit block. Instead of employing a guide pin 100, the V-grooves instead of being stamped in a straight line across parts 83 and 88 may be stamped in an arc to conform to the film loop so that the tension of the film section passing over the slit block will not tend to pull the film out of the V-notches.

In Figures 1 and 13 I show an adjustable brace plate 101 which is a flat slotted plate passing through a slit in base plate 1 and having a foot 102. A thumb-screw 103 passes through the slot in brace 101 and screws into a threaded hole in platform 5. The platform is recessed to receive plate 101 and lie flush with the surface of the platform, and this recess serves as a guide for the brace and prevents lateral swing on the set-screw. In setting up the projector on a table it may be necessary to adjust the projector upward to properly frame the picture on the screen, when this is necessary thumb-screw 103 is loosened and the projector front end is raised allowing the plate 101 to slip downward and when the picture shows at the desired height on the screen, the thumb-screw is tightened to clamp the plate 101 and the projector front end will be supported by foot 102.

The circuit controller shown in Figure 5 has the additional function of damping the vibrations of the film caused by the movements of the film loop 40 in its rapid continuous movement, and thus performs the same function as the pair of pins 27, that is, it serves both to provide the necessary tension for the film section passing over the aperture block and eliminates the effect of vibration.

In Figure 1, a transformer 104 is shown mounted on platform 5 for reducing the voltage to the projector lamp. The various circuit connections from the current supply to the electrical devices are not illustrated since they form no part of my present invention.

To rewind the film after projection and preparatory to re-use, empty reel 21 is removed from its support and full take-up reel 38 is substituted and empty reel 21 is placed on the take-up reel support. The end of film 20 from reel 38 is then fastened directly to the hub of reel 21 to wind in the same direction as when projecting the picture. The motor is started and through its belt drive to the main driven shaft 17 and the take-up driving pulley thereon, will, through chain 63 and sprocket 59 rotate the reel 21 (now on the take-up spindle 51) in the same direction as when projecting a picture, and rewind the film directly from reel 38 onto reel 21 with the emulsion side inward in readiness for projection operation when the reels 21 and 38 are restored again to the positions of Figure 1. During this operation the feed sprocket 19, shutter 14, and claw-feed mechanism 15 will operate, since they are diven from main shaft 17, but the film will not be in position to be actuated thereby. Thus by the arrangement of driving connections I am enabled to rewind reels on the projector wthout changing or reversing the driving connection and avoid the use of a separate rewinding machine.

What I claim is:

1. In a combined motion picture projector and photographic sound record reproducer, the combination of a photographic film having pictures and a sound record thereon and carried by a feed reel, a picture projector, a continuous feed sprocket for feeding the film to the projector from said reel, a device for intermittently feeding the film through the projector from which the film travels in a loose loop, a light sensitive device contained in a housing located below the picture projector, a tubular aperture block over which the film travels adjacent said light sensitive device, a lens tube and exciter lamp housing mounted adjacent said block, said lens tube having a sliding fit in said block and adapted to project a light beam into the aperture from the interior of the block, a film tensioning guide adjacent the aperture block for engaging the loose film loop in advance of the aperture, a freely rotating roller over which the film travels after passing over the aperture, a fly-wheel on the spindle of said roller, a second freely rotating roller closely adjacent the first named roller over which the film travels in reverse direction, a continuously rotating feed sprocket adjacent the first named roller engaging the section of film travelling from said second roller, the axes of said rollers and sprocket being approximately in the same plane whereby the film section passing around said second roller is caused to contact the major part of its periphery, and a guide roller around which the film passes to a take-up reel.

2. In an apparatus as defined in claim 1, a removable auxiliary housing for the lamp housing, film gate and feed mechanism provided with a hinged section for access to the feed mechanism, and a sound deadening lining on the inner wall of said housing where it surrounds the feed mechanism provided with slots for interrupting sound waves.

3. In an apparatus as defined in claim 1, a tension device consisting of two blades having oppositely located notches extending across the width of the blades, one blade being fixed in position and the other movable, a spring actuated electric circuit controlling member pivoted to the fixed blade and linked to the movable blade to place it under spring tension, said blades being positioned to permit the film to pass edgewise between them in the oppositely disposed notches and whereby the film will maintain said blades in spaced relation and the movable blade in position to hold the switch member in the closed circuit position.

4. In an apparatus as defined in claim 1, a film tension guide adjacent the aperture block consisting of a pair of normally fixed posts set closely at an angle between which the film passes with a short bend in advance of the aperture.

LOUIS J. SIMONS.